United States Patent Office 3,168,552
Patented Feb. 2, 1965

3,168,552
3-(2-ISOPENTENYL) - 4 - HYDROXY BENZOIC ACID AND DERIVATIVES AND PREPARATION THEREOF
Herman Hoeksema, Kalamazoo Township, Kalamazoo County, Mich., assignor to The Upjohn Company, Kalamazoo, Mich., a corporation of Michigan
No Drawing. Filed Dec. 5, 1955, Ser. No. 550,817
9 Claims. (Cl. 260—473)

This invention relates to novel compositions of matter and to a process for the preparation thereof and is particularly directed to novel compositions of matter derived from streptonivicin.

Streptonivicin, also known as Antibiotic 66a, and as Albamycin (registered trademark), is an antibiotic substance obtained as an elaboration product of *Streptomyces niveus*. As more fully set forth in copending U.S. application of Dietz, De Boer, Smith, Bergy, and Hoeksema, Serial No. 516,742, now abandoned, filed June 20, 1955, streptonivicin is characterized by an optical rotation $[\alpha]^D_{23-26°}$=minus 63.0 degrees (c., 1 percent absolute ethanol, 2 decimeters); by being very soluble in water above a pH of 9 with its solubility decreasing to about zero as the pH decreases from 9.0 to 5.0; by being soluble in lower alkanols and acetone; by the following element analysis:

| Element: | Percent |
|---|---|
| Carbon | 59.40 |
| Hydrogen | 6.44 |
| Nitrogen | 4.54 | by a molecular weight of about 618 ±2 percent; by an empirical formula of about $C_{30-32}H_{38-42}O_{11-12}N_2$; by the presence of two acidic groups: $pKa_1$ 4.3, $pKa_2$ 9.1 in water, and $pKa_1$ 5.7 and $pKa_2$ 11.9 in dimethylformamide; by existing in two crystal forms, Form 1 melting with decomposition between 174 and 178 degrees centigrade and Form 2 melting with decomposition between 149 and 151 degrees centigrade, which forms have characteristic infrared absorption spectra and X-ray diffraction patterns as set forth in the above-mentioned copending application; by forming acid and neutral salts with both inorganic and organic bases; by ultraviolet absorption maxima at 334 millimicrons in 95 percent ethanol solution containing 0.01 normal sulfuric acid and 311 millimicrons in 95 percent ethanol solution containing 0.01 normal potassium hydroxide; by ultraviolet inflections at 250, 262, 282, and 304 millimicrons in 95 percent ethanol solution containing 0.01 normal sulfuric acid and at 237, 255, and 287 millimicrons in 95 percent ethanol solution containing 0.01 normal potassium hydroxide; and by activity against a large number of Gram-positive and Gram-negative bacteria.

It has now been found that novel compositions of matter according to this invention are obtained by acting upon streptonivicin (I) with acetic anhydride. By this procedure, the streptonivicin molecule is cleaved yielding a new compound which has been identified as 3-(3-methyl-2-butenyl)-4-acetoxybenzoic acid (II), which on alkaline hydrolysis is converted to 3-(3-methyl-2-butenyl)-4-hydroxybenzoic acid (III), and on hydrogenation over platinum oxide to 3-isoamyl-4-acetoxybenzoic acid (IV). The latter compound (IV) on alkaline hydrolysis yields 3-isoamyl-4-hydroxybenzoic acid (V). When 3-(3-methyl-2-butenyl)-4-acetoxybenzoic acid is refluxed in the presence of concentrated hydrochloric acid, it is converted to the known 2,2-dimethyl-6-chromancarboxylic acid (VI) [J.A.C.S. 65: 289–93 (1943)].

It has been found further that when streptonivicin (I) is treated with concentrated hydrochloric acid, it is converted to a new compound (VII) having about two-thirds the molecular weight of streptonivicin (I) and an analysis corresponding to the molecular formula: $C_{22}H_{21}O_6N$. This new compound (VII), on refluxing with acetic anhydride yields 2,2-dimethyl-6-chromancarboxylic acid (VI).

Concomitant with the 2,2-dimethyl-6-chromancarboxylic acid there is obtained an optically inactive neutral compound (X) having a melting point of 203–206 degrees centigrade, an analysis corresponding to the molecular formula: $C_{14}H_{11}NO_5$, a characteristic ultraviolet absorption spectrum in 0.01 normal sulfuric acid in 70 percent ethanol, and a characteristic infrared absorption spectrum in a mineral oil mull.

It has been found further that when streptonivicin (I) is hydrogenated over platinum oxide to dihydrostreptonivicin (VIII) (see my copending application, Serial No. 545,307, filed November 7, 1955) and the latter refluxed with acetic anhydride, there is obtained 3-isoamyl-4-acetoxybenzoic acid (IV). This compound (IV), on alkaline hydrolysis, gives 3-isoamyl-4-hydroxybenzoic acid (V).

The acetic anhydride reaction on both streptonivicin and dihydrostreptonivicin also produces an optically active neutral compound (IX) having a melting point of 167–173 degrees centigrade, and an optical rotation, $[\alpha]_D^{24}$=minus 94.4 degrees (c., 2 percent in dimethylformamide), an analysis corresponding to the molecular formula: $C_{23}H_{28}N_2O_{10}$, a characteristic ultraviolet absorption spectrum in 0.01 normal sulfuric acid in 70 percent ethanol, and a characteristic infrared absorption spectrum in a mineral oil mull.

The above-noted findings are represented graphically as follows:

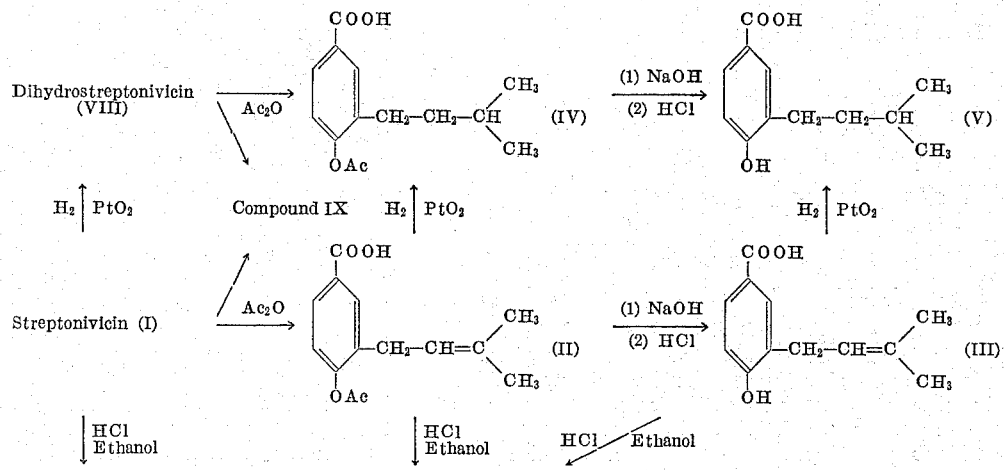

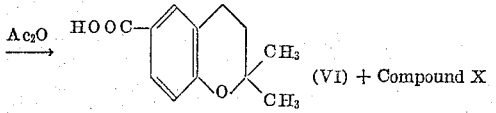

The novel compounds of this invention are useful as intermediates, as buffers, as antiseptics and disinfectants, and as antioxidants. The carboxylic acids II, III, IV, V, and VI can be converted to compounds having local anesthetic properties by first reacting them with thionyl chloride to form the acid chloride and then with dimethylaminoethanol or with pyrrolidylalkanols according to the procedure set forth in U.S. Patent 2,719,851. In compounds III and V the phenolic hydroxyl group can be etherified by reaction with an alkyl halide or aralkyl halide such as methyl, ethyl, n-propyl, isopropyl, amyl, 2-ethylhexyl, and benzyl chlorides, or by other known methods such as reaction with dialkyl sulfates or diazomethane. Compounds IX and X have coumarin-like properties and under mild hydrolytic conditions (methanol-HCl or ethanol-NaOH) are converted to simple coumarin derivatives useful as intermediates and antioxidants.

The following examples are illustrative of the process and products of the present invention, but are not to be construed as limiting.

EXAMPLE 1

*3-(3-methyl-2-butenyl)-4-acetoxybenzoic acid (II)*

A solution containing 100 grams (0.162 mole) streptonivicin (I), one liter pyridine, and 216 grams (2.14 moles) acetic anhydride was heated four hours under reflux. It was then chilled to five degrees centigrade and 1500 milliliters of water was added. The solution was then brought to pH 2 by addition of 1030 milliliters twelve normal hydrochloric acid. The resulting precipitate was filtered and dried (110 grams). It was then extracted with ether. The ether solution was evaporated to dryness and the residue was then crystallized from 400 milliliters ethanol and 600 milliliters of water to yield 26 grams of 3-(3-methyl-2-butenyl)-4-acetoxybenzoic acid (II), melting 100–113 degrees centigrade. On recrystallization from ethanol, a product having the following properties was obtained:

(a) Melting point 116–120 degrees centigrade (with decomposition)
(b) pKa 5.67 (50% ethanol)
(c) Infrared absorption (mineral oil mull) very similar to acetylsalicylic acid
(d) Optical rotation, none
(e) Ultraviolet absorption:

288 m$\mu$, $a$=63.2 (0.01 N KOH, 70% EtOH)
234 m$\mu$, $a$=51.6 (0.01 N H$_2$SO$_4$, 70% EtOH)

(f) Analysis:
Calculated for C$_{14}$H$_{16}$O$_4$:

| C | H | CH$_3$$\overset{O}{\overset{\|}{C}}$ | C—CH$_3$ | H$_2$ uptake | eq. wt. |
|---|---|---|---|---|---|
| 67.72 | 6.50 | 17.3 | 6.04 | 1 mole | 248.27 |

Found:
67.75  6.56  16.28  8.84  1.2 moles  254.59
67.76  6.39

EXAMPLE 2

*3-(3-methyl-2-butenyl)-4-hydroxybenzoic acid (III)*

A solution of 0.5 gram (0.002 mole) 3-(2-isopentenyl)-4-acetoxybenzoic acid (II), twenty milliliters (0.020 mole) one normal sodium hydroxide, and fifty milliliters ethanol stood three hours at 25 degrees centigrade. It was then acidified with 3.3 milliliters of six normal hydrochloric acid to pH 2. The solution was distilled at sixteen millimeters mercury to an aqueous concentrate, and the resulting precipitate extracted into ether. The ethereal solution was dried over sodium sulfate and evaporated to dryness. The residue was crystallized from acetone and water by rapid evaporation of the acetone (crystallizing dish) to yield 350 milligrams (.0017 mole— 85 percent) of 3-(3-methyl-2-butenyl)-3-hydroxybenzoic acid (III) characterized as follows:

(a) Analysis.—Calcd. for C$_{12}$H$_{14}$O$_3$: C, 69.88; H, 6.84; M. wt., 206.23. Found: C, 69.89; H, 6.94; eq. wt., 208
(b) pKa$_1$ 6.2, pKa$_2$ 11.0, solvent 66 percent alcohol
(c) Melting point 103–106 degrees centigrade
(d) Ultraviolet absorption:

288 m$\mu$, $a$=75.2 (0.01 normal KOH, 70% EtOH) and
260 m$\mu$, $a$=68.2 (0.01 normal H$_2$SO$_4$, 70% EtOH)

EXAMPLE 3

*Ethyl 3-(3methyl-2-butenyl)-4-hydroxybenzoate*

A solution of 55 grams of ethyl p-hydroxybenzoate in 200 milliliters of acetone was heated to reflux and fifty grams of anhydrous potassium carbonate added. While gently refluxing the solution, 33 grams of 3-methyl-3-chlorobutene (U.S. Patent 2,382,031) was added. The reaction mixture was heated under reflux with stirring for three hours. The acetone was distilled and enough water added to dissolve the salt and the resultant extracted with 150 milliliters of ether. To the ether extract there was added 100 milliliters of petroleum ether and the acidic components extracted with four portions of five percent aqueous sodium hydroxide. The solvent was then removed, the bulk by distilling and the rest by heating on a steam bath under reduced pressure for several hours. The resulting product, ethyl 4-(1,1-dimethylallyloxy)-benzoate, was heated to boiling under reduced pressure (40 mm. Hg) until boiling point became constant. The product was then dissolved in 40 milliliters of petroleum ether and extracted with five percent sodium hydroxide. The alkaline extract was acidified with dilute sulfuric acid and the phenolic product extracted with ether. Evaporation of the ether yielded the desired ethyl 3-(3-methyl-2-butenyl)-4-hydroxybenzoate which on hydrolysis by the procedure of Example 3 gave 3-(3-methyl-2-butenyl)-4-hydroxybenzoic acid (III).

EXAMPLE 4

*3-isoamyl-4-acetoxybenzoic acid (IV)*

(A) A solution of two grams of 3-(3-methyl-2-butenyl)-4-acetoxy-benzoic acid (II) in fifty milliliters absolute ethanol was hydrogenated one hour at forty pounds per square inch gauge hydrogen with one gram Adams' catalyst (PtO$_2$). After filtration, the filtrate was treated with 150 milliliters water to yield 1.3 grams of a partially crystalline product which on recrystallization from warm ethanol-water yielded 1.06 grams of 3-isoamyl-4-acetoxybenzoic acid (IV) having a melting point of 136–144 degrees centigrade.

(B) A solution of 2 grams dihydrostreptonivicin (VIII) (.0032 mole), twenty milliliters pyridine, and four grams acetic anhydride (.039 mole) was refluxed for three hours. The mixture was treated with 25 milliliters water, chilled to five degrees centigrade and brought to pH one with twenty milliliters 12 normal hydrochloric acid. The whole mixture was extracted three times with fifty milliliters ether. The combined extracts were washed with 150 milliliters of water, dried over anhydrous $Na_2SO_4$ and evaporated to dryness. The residue was crystallized from 150 milliliters of thirty percent ethanol (0.32 grams, M.P. 135–144 degrees centigrade). This material is identical to compound IV.

*Analysis:*

Calcd. for $C_{14}H_{18}O_4$:  
C, 67.18  
H, 7.25

Found:

| | A. | B. |
|---|---|---|
| C | 67.50 | 67.32 |
| | | 67.47 |
| H | 7.04 | 6.83 |
| | | 6.92 |

Ultraviolet absorption:

| | $m\mu$ | $a$ | 70% EtOH 0.01 N KOH | 0.01 N $H_2SO_4$ |
|---|---|---|---|---|
| A | 290 | 56.3 | x | |
| | 237 | 50.2 | | x |
| B | 290 | 48.8 | x | |
| | 237 | 48.8 | | x |

The material which could not be extracted from ether was separated by filtration and crystallized from ethanol (absolute 75 milliliters) to yield 1.0 gram (M.P. 155–170 degrees centigrade). It was recrystallized from 25 milliliters 95 percent ethanol to yield 0.68 gram of compound IX (Example 2) melting at 164–173 degrees centigrade.

EXAMPLE 5

Following the procedure of Example 2, 3-isoamyl-4-acetoxy-benzoic acid is hydrolyzed to 3-isoamyl-4-hydroxybenzoic acid.

EXAMPLE 6

*Compound VII*

A solution of ten grams streptonivicin (I) (.0162 mole) in 100 milliliters absolute ethanol was heated to boiling under reflux. Following this, fifty milliliters concentrated hydrochloric acid was added to the refluxing solution over a period of seven minutes. (Precipitation of Compound VII began after 45 milliliters was added.) The mixture was heated under reflux an additional one-half hour, then cooled and filtered. The solid (6.1 grams, .0154 mole, 95 percent) was recrystallized from 400 milliliters n-butanol to yield 5.4 grams. This was then recrystallized from 1250 milliliters ethanol to yield 4.5 grams of Compound VII melting at 288–291 degrees centigrade.

*Analysis.*—Calcd. for $C_{22}H_{21}O_6N$: C, 66.82; H, 5.35; N, 3.54. Found: C, 67.52; H, 5.32; N, 3.59.

Ultraviolet absorption:

328 m$\mu$, $a$=68.2, 0.01 N KOH, 70% EtOH  
252 m$\mu$, $a$=84.7, 0.01 N KOH, 70% EtOH  
331 m$\mu$, $a$=61.0, 0.01 N $H_2SO_4$, 70% EtOH  
335 m$\mu$, $a$=58.0, 95% EtOH

A solution of one gram (.004 mole) 3-(3-methyl-2-butenyl)-4-acetoxybenzoic acid (II) in ten milliliters absolute ethanol was heated to boiling. Then 5 milliliters twelve normal hydrochloric acid was added and this solution refluxed one and one-half hours. It was cooled, added to 35 milliliters of water, and extracted with one-half volume ether. The ether was evaporated to yield an oil. Ultraviolet determinations showed the oil to have the same spectrum in acid and base, indicating an ester. The oil was dissolved in 35 milliliters ethanol and treated with ten milliliters (.010 mole) one normal sodium hydroxide. The solution stood three days at 25 degrees, was then acidified with 100 milliliters 0.1 normal hydrochloric acid. The resulting white crystals were recrystallized from twenty milliliters fifty percent ethanol to yield 0.55 gram (67 percent) of 2,2-dimethyl-6-chromancarboxylic acid melting at 181–183 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of 3-($\gamma,\gamma$-dimethylallyl)-4-hydroxybenzoic acid and 3-($\gamma,\gamma$-dimethylallyl)-4-acetoxybenzoic acid.
2. 3-($\gamma,\gamma$-dimethylallyl)-4-hydroxybenzoic acid.
3. 3-(3-methyl-2-butenyl)-4-acetoxybenzoic acid.
4. Ethyl 3-($\gamma,\gamma$-dimethylallyl)4-hydroxybenzoate.
5. The process which comprises heating streptonivicin with acetic anhydride to form 3-(3-methyl-2-butenyl)-4-acetoxybenzoic acid and isolating the 3-(3-methyl-2-butenyl)-4-acetoxybenzoic acid so produced.
6. A process for making 3-(3-methyl-2-butenyl)-4-hydroxybenzoic acid which comprises (1) heating streptonivicin with acetic anhydride to form 3-(3-methyl-2-butenyl)-4-acetoxybenzoic acid, and (2) hydrolyzing the acetoxy group to form 3-(3-methyl-2-butenyl)-4-hydroxybenzoic acid.
7. The process of claim 6 in which the 3-(3-methyl-2-butenyl)-4-hydroxybenzoic acid is hydrogenated to form 3-isoamyl-4-hydroxybenzoic acid.
8. The process which comprises heating dihydrostreptonivicin with acetic anhydride to form 3-isoamyl-4-acetoxybenzoic acid and isolating the 3-isoamyl-4-acetoxybenzoic acid so produced.
9. A process for making 3-isoamyl-4-hydroxybenzoic acid which comprises (1) reacting dihydrostreptonivicin with acetic anhydride to form 3-isoamyl-4-acetoxybenzoic acid, and (2) hydrolyzing the acetoxy group to form 3-isoamyl-4-hydroxybenzoic acid.

References Cited by the Examiner

UNITED STATES PATENTS

| | | | |
|---|---|---|---|
| 557,410 | 3/96 | Majert | 260—521 |
| 611,014 | 9/98 | Limpach | 260—521 |
| 648,580 | 5/00 | Behal | 260—488 |
| 706,356 | 8/02 | Summers | 260—480 |
| 1,439,500 | 12/22 | Bailey | 260—345.2 |
| 1,917,153 | 7/33 | Pomgratz | 260—345.2 |
| 1,998,750 | 4/35 | Bruson et al. | 260—521 |
| 2,022,185 | 11/35 | Bruson | 260—521 |
| 2,378,449 | 6/45 | Tishler | 167—65 |
| 2,378,876 | 6/45 | Waksman | 167—65 |
| 2,449,994 | 9/48 | Gresham | 260—488 |
| 3,049,534 | 8/62 | Wallick | 260—210 |

OTHER REFERENCES

Beilstein: vol. X, page 284 (1927).  
Beilstein: vol. XIV, pages 388–9 (1931).  
Claisen et al.: Chem. Abs., vol. 8, p. 66 (1914).  
Lauer et al.: J.A.C.S., vol. 61, pp. 3039–43 (1939).  
Lauer et al.: J.A.C.S., vol 61, pages 3043–47 (1939).  
Lauer et al.: J.A.C.S., vol. 65, pages 289–293 (1943).

LORRAINE A. WEINBERGER, *Acting Primary Examiner.*

DANIEL ARNOLD, CHARLES B. PARKER, NATHAN MARMELSTEIN, LEON ZITVER, IRVING MARCUS, *Examiners.*